April 21, 1925.  1,534,067
H. E. L. OWEN
ENGINE COOLING MEANS AND WEATHER PROTECTION FOR USE IN CONNECTION WITH MOTOR ROAD VEHICLES
Filed Nov. 4, 1922   3 Sheets-Sheet 1
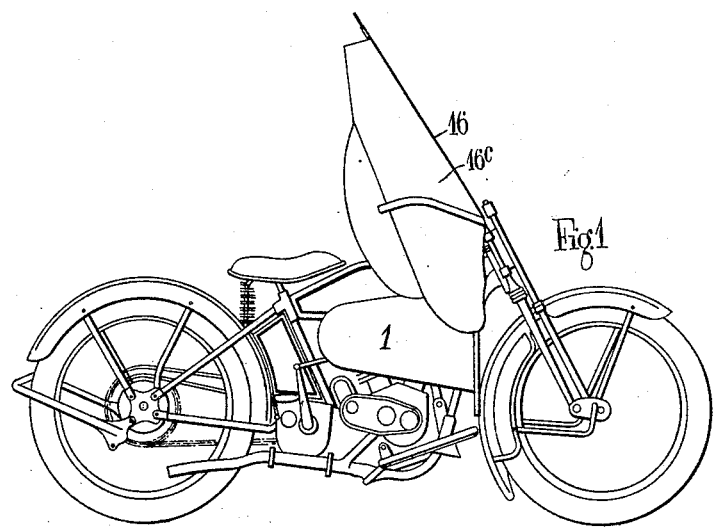
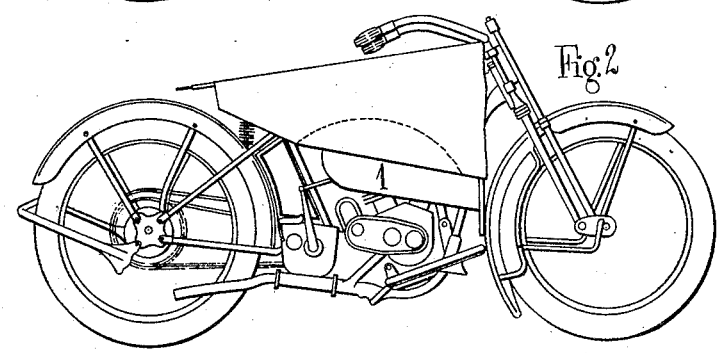
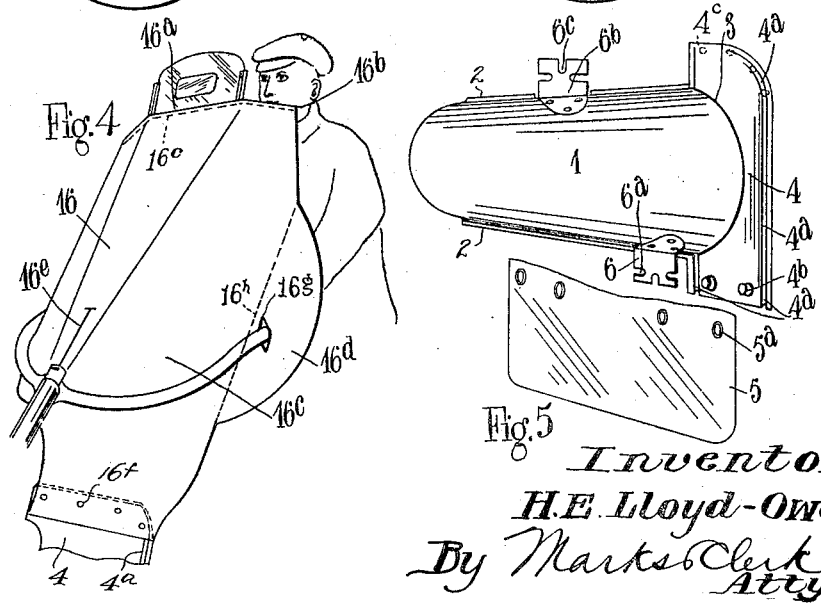
Inventor
H. E. Lloyd-Owen,
By Marks & Clerk
Attys.

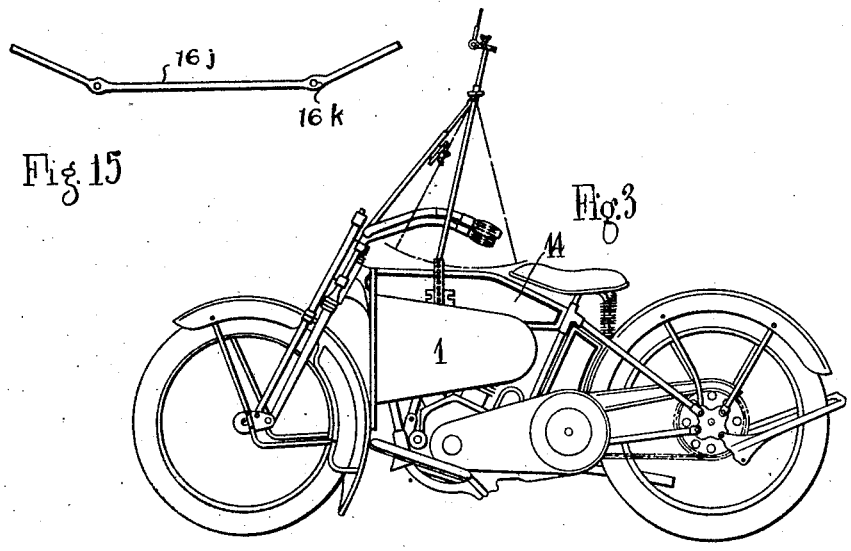
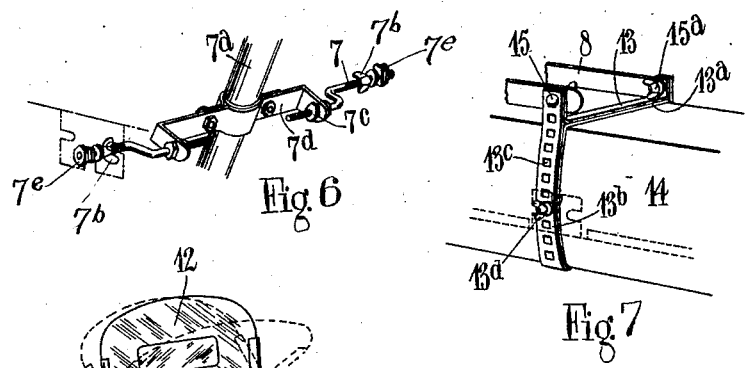
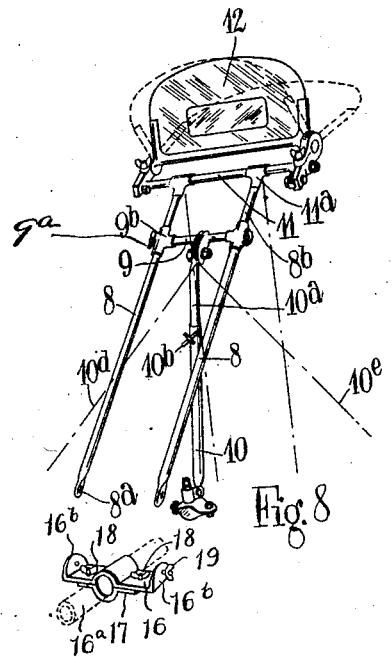

April 21, 1925.  1,534,067
H. E. L. OWEN
ENGINE COOLING MEANS AND WEATHER PROTECTION FOR USE IN CONNECTION
WITH MOTOR ROAD VEHICLES
Filed Nov. 4, 1922   3 Sheets-Sheet 3

Inventor
H. E. Lloyd-Owen,
By Marks & Clerk
Attys.

Patented Apr. 21, 1925.

1,534,067

UNITED STATES PATENT OFFICE.

HENRY ERNEST LLOYD OWEN, OF WINKFIELD, NEAR WINDSOR, ENGLAND.

ENGINE-COOLING MEANS AND WEATHER PROTECTION FOR USE IN CONNECTION WITH MOTOR ROAD VEHICLES.

Application filed November 4, 1922. Serial No. 599,156.

*To all whom it may concern:*

Be it known that I, HENRY ERNEST LLOYD OWEN, a subject of the King of Great Britain and Ireland, and residing at Winkfield Place, Winkfield, near Windsor, in the county of Berks, England, have invented certain new and useful Improvements in and Relating to Engine-Cooling Means and Weather Protection for Use in Connection with Motor Road Vehicles, of which the following is a specification.

This invention relates to wind or weather protection for use in connection with motor cycles and the like, either when used alone or in conjunction with a sidecar, and has particular reference to wind or weather protection of the type supported by a frame and adapted to lie between the steering column and the rider.

An object of the invention is to provide an improved form of weather and wind protection which may be safely used and which is adapted to protect from the front and to a certain extent laterally the body of the rider while at the same time providing a protection which does not interfere with the operations of steering nor is affected or displaced by the steering movements.

A further aim of the invention lies in combining air-cooling means for the engine with means for providing weather protection.

The invention consists in the provision of weather protection means for motor cycles and the like, comprising a flexible or partly flexible weather shield or apron-like cover adapted to extend upwardly in front of the rider to afford protection for the upper part of the body or trunk, carried by a support or frame adapted to be pivotally secured (preferably in a readily detachable manner) to the motor cycle frame or other fixed part, so that the support and shield or cover may be adjusted towards or away from the rider or seat of the cycle about a horizontal pivoting axis.

The invention also comprises the combination with weather protection, as above specified, of funnel-like engine cooling means of known kind and of any appropriate cross sectional shape and leg shields attached thereto, of rigid material, or partly rigid material and partly flexible material, constructed and arranged as an extension of the weather protection shield for the upper part of the body.

Further features of the invention will be hereinafter described and delimited in the claims.

In the accompanying drawings:—

Figures 1, 2 and 3 are side elevations of a motor cycle illustrating a mode of application of the invention thereto;

Figure 4 is a perspective view of weather protection such as shown in Figure 1;

Figure 5 is a perspective view of a funnel-shaped member having a leg shield according to the invention and with below it a further splash protection means.

Figure 6 is a perspective view of one form of attachment device for securing the funnel-shaped members to the frame of a motor cycle;

Figure 7 is a perspective view illustrating one mode of securing the funnel-shaped members at another point to the petrol tank of a motor cycle and illustrating a means for attaching the frame or struts of body weather protection according to the invention to a motor cycle;

Figure 8 is a perspective view of the frame struts or supporting members for the body weather protection shown in Figure 3;

Figures 9 and 10 are perspective views illustrating details of the joints or fixing means shown in Figure 8.

Figure 12:
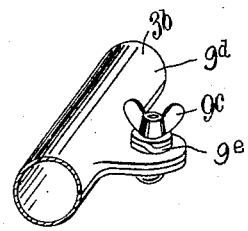
Figure 13:
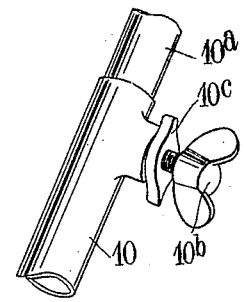
Figure 14:
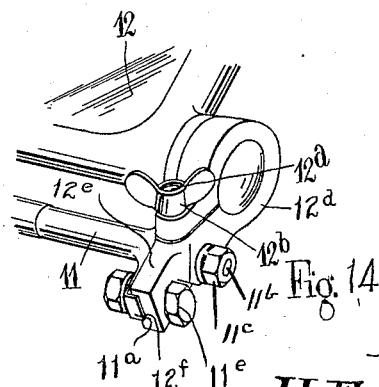

Figure 12 is a perspective view of an adjustable stop device for adjusting the vertical position of the weather shield; Figure 13 is a perspective view of looking means for the telescopic post employed as a strut for the frame of the weather shield; Figure 14 is an enlarged perspective view of one of the lower corners of the wind screen showing its attachment to the framework supporting the transparent glass weather shield or apron; Figure 15 is a detail view of an angular bar employed at the top of the flexible apron of securing it to the frame or support.

In carrying the invention into effect according to one convenient mode as applied, by way of example, to a motor cycle and wherein a weather protection device is combined with the engine-cooling means, a plate 1 (Figures 1, 2, 3 and 5) of sheet metal or other suitable material curved into a form somewhat resembling the shape of a hollow truncated cone as divided by an axial plane is adapted to be fitted upon each side of the frame of the bicycle in a position slightly forward of the engine (as shown in Figures 1 to 3) so that together the plates form a funnel device. These funnel-shaped plates 1 are preferably stiffened on at least two of their edges by being turned over to form beads, as at 2, Figure 5.

The forward or curved part of each funnel as at 3 is integrally united to a leg shield 4 formed of metal plate or other appropriate material. If desired, each funnel member 1 and its leg shield 4 may be stamped from metal and pressed into shape as one piece. The leg shields may be provided with channels or gutters $4^a$ for draining off mud or water splashes.

Towards the lower edge of each shield studs $4^b$ may be provided for supporting a flexible or other foot splash shield 5 which, as illustrated in Figure 5, is provided with orifices $5^a$ for engaging the studs $4^b$.

It is preferred that this splash shield 5 should extend from one side to the other of the machine between the forward end of the feet, footboards or rests of the rider.

Upon the lower edge of the funnel member 1 in a suitable position a lug 6 or other device may be provided for the purpose of securing the members to the cycle. For example, this lug 6 may be formed with slots $6^a$ adapted to afford alternative positions for engagement with fixing means. According to one form one or other of the slots, according to the design or proportions of the cycle, is adapted to engage cranked pins 7 of the clamping or supporting device shown in Figure 6 which may be fixed to the inclined forward bar $7^a$ of the frame. Winged nuts $7^b$ or other device may be employed for securing the lug in position upon the cranked pin 7. The provision of the cranked pin secured by nuts $7^c$ to the bracket $7^d$ enables the position of the part with which the slots $6^a$ engage to be adjusted vertically and horizontally as desired.

In order to provide for the correct transverse positioning of the funnel members, adjustable abutments may be provided upon the end parts of the crank members. These abutments may be in the form of nuts $7^e$ mounted on the screw threaded parts of the cranked pins and moved into a suitable vertical plane so that the slots $6^a$ may abut against the nuts and may be secured or locked in this position by the winged-nuts $7^b$ or other means.

The funnel members at their upper edge may be provided with lugs $6^b$ similar to the lugs 6 and having slots $6^c$ for enabling the lugs to be attached to funnel securing means, for example, as hereinafter described.

It may be observed that although one convenient mode of mounting or securing the funnel members with their leg shields has been described above, other means or devices of known character may be employed for this purpose.

When in position the funnel-like members present convex surfaces in an outward direction so that when travelling, air is caught and directed towards and on to the cylinder surfaces whereby an increased cooling effect is obtained.

For supporting the weather protection for the body of the rider, two aluminium or other metal tubular struts 8 are mounted and pivoted upon the frame or other fixed part of the cycle in rear of the handlebars. These tubular struts 8 may be arranged parallel to one another, for example as shown in Figure 8.

According to one convenient mode, the lower ends of the struts are provided with flattened portions having holes or eyes $8^a$ for the purpose of engaging suitable securing means, such as shown in Figure 7 to be referred to hereinafter, or as illustrated in the lower part of Figure 8 where a stirrup clamp member 16 is fixed upon the crossbar $16^a$ of the cycle by a clip 17 by the aid of bolts and winged nuts 18, the members 8 being secured by winged nuts 19 to the ears $16^b$ of the stirrup clamp members 16.

The struts 8 may be provided with extension member $8^b$ which fit and are adapted to slide or telescope with relation to the members 8. At the termination of the members 8 a cross or bracing piece 9 may be secured by the aid of joints $9^b$ or otherwise. With a view to securing the telescope extensions $8^b$ in any appropriate position with relation to the parts 8 means may be provided for clamping the two parts together or for affording an adjustable stop for the telescope extension. According to one form (see Figure 8) the members $8^b$ may be clamped or secured at the joints $9^b$ by set screws $9^a$ whilst according to another form each member $8^b$ may have slidably mounted upon it a split sleeve $9^d$ which may be locked upon its member $8^b$ in any adjusted position by the winged nut $9^c$, a spring washer $9^e$ being preferably provided as shown in the drawing. The sleeves act as adjustable stops and abut against the joints $9^b$, the weight of the superstructure holding the parts in the adjusted position.

The bracing piece 9 may be utilized to serve as a convenient mounting or point of attachment for a third strut consisting of a tubular post 10 which may have a telescopic extension $10^a$ securable in any adjusted position by any suitable device; for instance, a fly set screw $10^b$ and lock nut $10^c$ may be provided. The extension $10^a$ is preferably pivotally connected to the bracing piece 9 by a connection such as that illustrated in Figure 8 adapted to permit angular movement of the parts 10 and 10ᵃ.

The post 10 at its lower end may be mounted or secured (as hereinafter described) in one of several alternative positions. For example, it may be temporarily fixed adjacent the mid point of the handle bars, as indicated by the dot and dash line 10ᵈ (in Figure 8) and as shown in Figure 3, or it may be secured in an approximately vertical position (see the full line drawing, Figure 8) or it may be angularly and rearwardly disposed (dot and dash line 10ᵉ).

Figure 11:
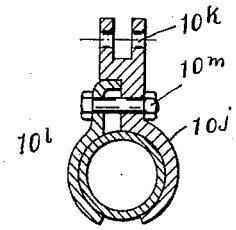
Figure 11 is a sectional view of an alternative fixing means to that shown in Figure 9.
Figure 10:
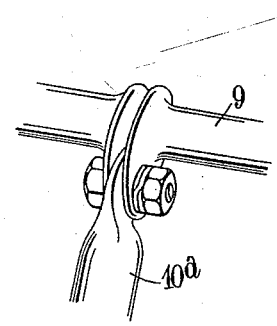

In each case any appropriate and preferably pivotal securing means or devices may be employed for fixing the post 10 to the cycle. Figure 9 represents one form of securing means comprising a pivotal joint 10ᶠ transverse to the post 10 and a vertical pivotal joint member 10ᵍ working on a pin 10ʰ carried by one part of a two-part clamping clip 10ⁱ; these joints permit a pivoting or hinging movement in two planes and the cup 10ⁱ may be employed for connecting the post 10 to the handlebar so that the latter still retains freedom of movement while Figure 11 shows a clamp which is suitable for fixing the post 10 to the frame cross bar of the cycle.

This clamp (Figure 11) comprises a jaw 10ʲ having a bearing 10ᵏ for a transverse pivot pin or a pair of trunnions carried by the post 10. A second jaw 10ˡ and a bolt 10ᵐ serves to secure the clamp in position on the cross bar.

The upper ends of the extension members 8ᵇ are adapted to carry an apron or flexible weather protection together with a transparent or partly transparent wind screen. With this end in view a cross bar 11 may be united to the extension members 8ᵇ by joints, such as 11ᵃ, or otherwise. This bar 11 may carry any appropriate form of wind screen, such as 12, adjustably mounted thereon by joints and means such as shown in Figure 14.

The trunnions 12ᶜ of the screen 12 are clamped in a split bearing block 12ᵈ by the wing nut 12ᵇ which works on the screw threaded stud 12ᵃ. The block 12ᵈ is provided with an extension 12ᵉ in which the end of the cross bar 11 is secured. The bar 11 has a screwthreaded extension 11ᵇ (which receives a nut 11ᶜ) and has a right-angled piece 11ᵈ which fits into a slot 12ᶠ in the extension 12ᵃ and is secured by a bolt 11ᵉ.

For pivotally securing the struts 8 to the cycle a stirrup piece 13 (Figure 7) with upwardly turned and perforated ends may be mounted over the tank 14 of the cycle and under the cross bar of the frame of the cycle. This stirrup may be bedded upon a rubber band or strap 13ᵃ which is passed round the tank, the stirrup being rigidly secured in position with a metal strap or band 13ᵇ which passes round the tank over the rubber packing band 13ᵃ. This strap 13ᵇ is provided with a series of perforations 13ᶜ which are employed in fixing the strap and securing the funnel members, as will hereinafter appear.

The struts are adapted to be engaged by screw threaded studs 15 having fly-nuts 15ᵃ through the medium of the orifices 8ᵃ. The studs 15 also serve as a means for engaging a pair (one upon each side of the tank 14) of the perforations 13ᶜ in the strap 13ᵇ.

After the strap 13ᵇ has been tightened up upon the tank and secured by the studs 15 any excess of length of the strap may be cut off.

The strap is provided with a pair of studs having fly-nuts 13ᵈ which are employed to position and secure the upper edge of the funnel member 1. The fixing of the funnel member at this point may be effected by locating the studs on each side of the tank in appropriate holes of the series 13ᶜ engaging one or other of the slots 6ᶜ of the lug 6ᵇ (see dotted lines Figure 7) upon the studs and screwing home the fly-nuts 13ᵈ on intermediate spring or other washers.

The weather protection or shield 16 for the body may be of any suitable cloth or flexible material made up of a whole piece or in sections. The upper edge of the shield 16 may be connected to the means adapted to support it by the aid of any appropriate fastening clips, tabs or the like. According to one form the edge of the shield may be threaded upon or otherwise attached to a rod or bar 16ʲ having a straight position in the region 16ᵃ of the shield and two angularly disposed parts 16ᵇ. The material of the weather shield at its upper end may be coextensive with the angular bar or rod whereby protection is afforded directly to the front and laterally or obliquely by the wings such as shown at 16ᶜ, Figures 1 and 4. At or adjacent the angles of the bar or rod 16ʲ, holes 16ᵏ (see Fig. 15) may be formed therein of a suitable size to permit of their fitting over the studs 12ᵃ and being tightly held by the winged-nuts 12ᵇ (Figure 14).

The lateral edges of the weather shield may be extended or provided with flaps 16ᵈ to afford protection for the lower part of the arms of the rider. The flaps 16ᵈ may be folded inwardly, for example as shown in Figure 2 by the dotted line, when not required.

Orifices 16ᵍ for the handlebars may be formed in these flaps 16ᵈ or at the junctions 16ʰ of the flaps with the main part of the shield.

The lower part of the shield is provided with snap fastener members 16ᶠ for engaging studs 4ᶜ on the upper edge of the leg shields 4 (see Figures 4 and 5).

The lower portion of the weather protection or shield may be split or divided as at 16ᵉ along the centre line in an upward direction for a suitable distance to enable the shield to straddle the cross bar or adjacent parts of the cycle.

It will be appreciated from the foregoing description and the drawings that the weather protection is supported by the skeleton frame shown in Figure 3 and Figure 8 when in use lies in a more or less inclined position between the handlebars in front of the rider. The provision of the telescope, pivoted and jointed parts, such as described, affords considerable latitude for adjustment as regards position also vertically and angularly to suit the requirements of the rider or peculiarities of the particular machine to which the invention may be applied.

When a cycle is standing, by releasing the telescope member 10ᵃ the struts 8 and weather protection may be folded down over the saddle as illustrated in Figure 2 so that protection from the weather is provided for the saddle, engine and other parts.

It will be understood from the foregoing description that it is preferred that the whole of the fixing should be of such a nature that the engine-cooling means and weather protection may be attached to and detached from the cycle or car readily and with a minimum of adjustments, and that the nature of the fastenings and fixtures is such that a standard type of engine-cooling means and weather protection may be adjusted and applied to various types of motor cycle, as the means described for supporting and fastening the various devices are such as afford latitude in the positioning of the various parts.

Further, although appropriate means for supporting and positioning the engine-carrying means and weather protection has been described, other or alternative fixing and supporting means and devices may be devised or means and devices of known kind may be employed or adopted for carrying the invention into effect.

Claims:

1. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a clamping device upon a fixed tubular member of the frame of the cycle to which the lower ends of the pair of members are pivotally secured and a clamping clip to which the post is pivotally attached, the arrangement being such that the cover may be adjusted towards and away from the seat and fixed in any adjusted position.

2. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a clamping device upon a fixed tubular member of the frame of the cycle to which the lower ends of the pair of members is pivotally secured and a clamping clip to which the post is secured by joints so that there may be relative movement between the post and the clip in two planes, the arrangement being such that the cover may be adjusted towards and away from the seat and fixed in any adjusted position.

3. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a clamping device consisting of a stirrup piece having ears and means for securing the piece to the petrol tank of the cycle, the lower ends of the pair of members being pivotally secured to said ears and a clamping clip to which the post is pivotally attached, the arrangement being such that the cover may be adjusted towards and away from the seat and fixed in any adjusted position.

4. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a clamping device consisting of a stirrup piece having ears and means for securing the piece to the petrol tank of the cycle, the lower ends of the pair of members being pivotally secured to said ears, a clamping clip to which the post is secured by joints so that there may be relative movement between the post and the clip in two planes, the arrangement being such that the cover may be adjusted towards and away from the seat and fixed in any adjusted position.

5. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a telescopic extension member (such as 8^b) carried by each of the pair of members 8, a cross rod uniting the upper ends of the telescopic extension member, means carried by the cross rod for attaching the upper portion of the apron-like cover, a clamping device upon a fixed tubular member of the frame of the cycle to which the lower ends of the pair of members is pivotally secured and a clamping clip to which the post is pivotally attached, the arrangement being such that the cover may be adjusted towards and away from the seat and fixed in any adjusted position.

6. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a telescopic extension member (such as 8^b) carried by each of the pair of members 8, a cross rod uniting the upper ends of the telescopic extension member, means carried by the cross rod for attaching the upper portion of the apron-like cover, a clamping device upon a fixed tubular member of the frame of the cycle to which the lower ends of the pair of members is pivotally secured and a clamping clip to which the post is secured by joints so that there may be relative movement between the post and the clip in two planes, the arrangement being such that the cover may be adjusted towards and away from the seat and fixed in any adjusted position.

7. Weather protection means for motor cycles and the like comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a telescopic extension member (such as 8^b) carried by each of the pair of members 8, a cross rod uniting the upper ends of the telescopic extension member, means carried by the cross rod for attaching the upper portion of the apron-like cover, a clamping device consisting of a stirrup piece having ears and means for securing the piece to the petrol tank of the cycle, the lower ends of the pair of members being pivotally secured to said ears and a clamping clip to which the post is pivotally attached, the arrangement being such that the cover may be adjusted towards and away from the seat and fixed in any adjusted position.

8. Weather protection means for motor cycles and the like, comprising a flexible apron-like cover adapted to extend in front of the rider to afford protection for the upper part of the body, a frame adapted to support said cover comprising a pair of members (such as 8), a cross bar (such as 9) uniting the members towards their upper ends, an adjustable post pivotally attached to the cross bar, a telescopic extension member (such as 8^b) carried by each of the pair of members 8, a cross rod uniting the upper ends of the telescopic extension member, means carried by the cross rod for attaching the upper portion of the apron-like cover, a clamping device consisting of a stirrup piece having ears and means for securing the piece to the petrol tank of the cycle, the lower ends of the pair of members being pivotally secured to said ears, a clamping clip to which the post is secured by joints so that there may be relative movement between the post and the clip in two planes, the arrangement being such that the cover may be adjusted towards and away from the seat and fixed in any adjusted position.

9. Weather protection means as claimed in claim 5 wherein the cross rod supports a transparent wind screen.

10. Weather protection means as claimed in claim 1 in combination with rigid leg shields to the upper edge of which the lower part of the apron-like cover is attached.

11. Weather protection means as claimed in claim 1 in combination with rigid leg shields and funnel-like members for inducing a cooling action upon the engine and means for securing such to the cycle in a manner capable of adjustment vertically and horizontally of the cycle.

12. Weather protection means as claimed in claim 1 in combination with rigid leg shields secured to the cycle by the aid of slotted lugs permitting adjustment vertically and horizontally of the cycle and means for connecting the lower part of the apron-like cover to the upper edges of the shields.

In testimony whereof I have signed my name to this specification.

HENRY ERNEST LLOYD OWEN.